March 27, 1951  E. A. FIELD, JR  2,546,219
DRAFT REGULATOR
Filed Jan. 31, 1949
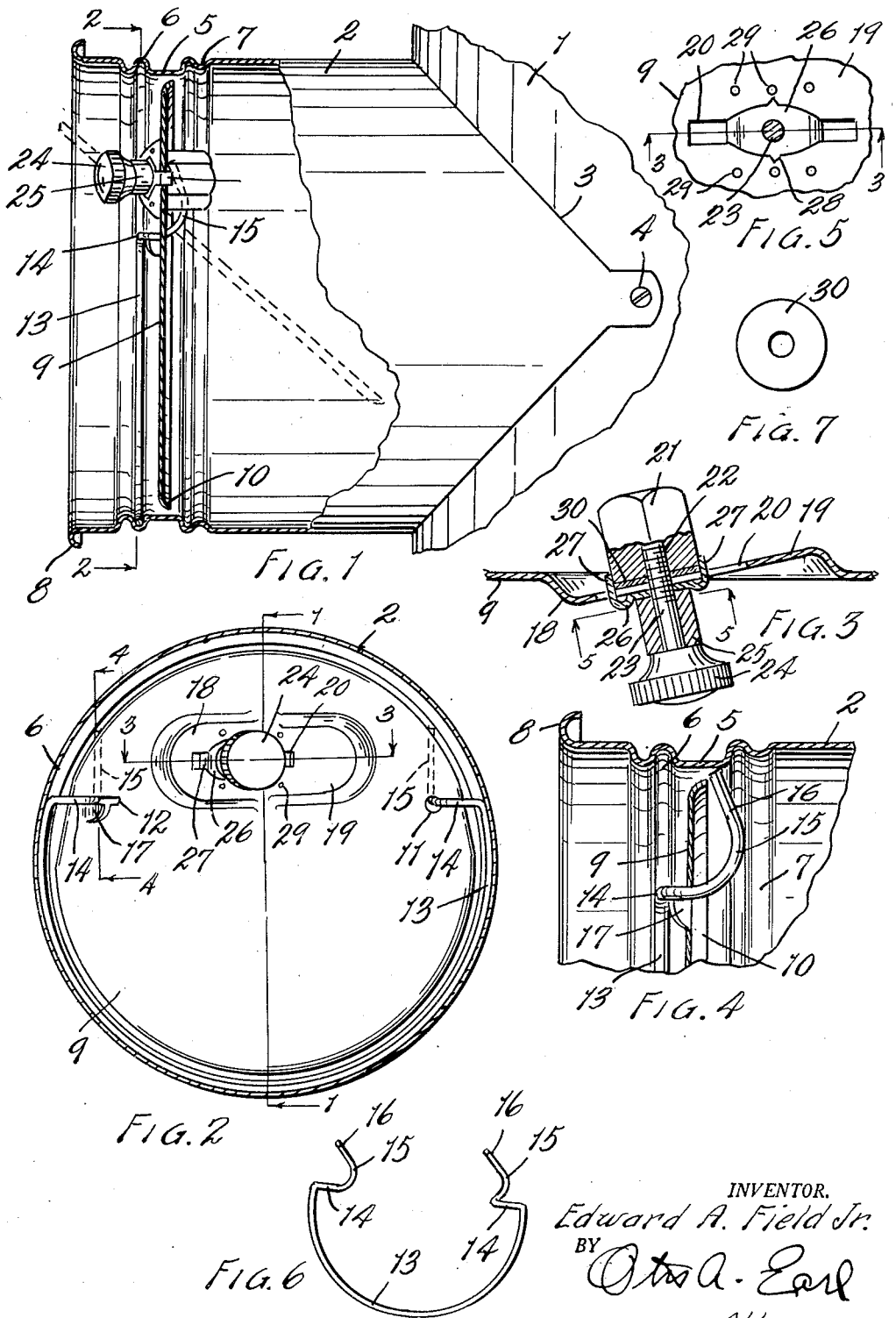
INVENTOR.
Edward A. Field Jr.
BY Otis A. Earl
Attorney.

Patented Mar. 27, 1951

2,546,219

UNITED STATES PATENT OFFICE 2,546,219

DRAFT REGULATOR

Edward A. Field, Jr., Mendota, Ill.

Application January 31, 1949, Serial No. 73,830

18 Claims. (Cl. 236—45)

This invention relates to improvements in draft regulators.

The main objects of this invention are:

First, to provide a draft regulator which is efficient and at the same time may be very economically produced.

Second, to provide a draft regulator which may be quickly and easily adjusted for use on vertical or horizontal flues or flues positioned intermediate the vertical and horizontal.

Third, to provide draft regulator gate mounting for swingably supporting a gate which does not become fouled in use by accumulations of dirt or soot.

Fourth, to provide a counterbalanced draft regulator gate in which the counterbalance can be readily adjusted to adapt the regulator for varying conditions both in the mounting position thereof and in the operating conditions.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in vertical section on a line corresponding to line 1—1 of Fig. 2, of a draft regulator embodying my invention.

Fig. 2 is a transverse section on a line corresponding to line 2—2 of Fig. 1.

Fig. 3 is an enlarged fragmentary view partially in section on a line corresponding to line 3—3 of Figs. 2 and 5.

Fig. 4 is an enlarged fragmentary view partially in section on a line corresponding to line 4—4 of Fig. 2, showing details of the gate support member and the pivotal mounting of the gate.

Fig. 5 is a fragmentary view on a line corresponding to line 5—5 of Fig. 3.

Fig. 6 is a perspective view of the gate hinge or support member.

Fig. 7 is a plan view of the supplemental weight.

Referring to the drawing, 1 represents a flue, in this instance a vertical flue. The housing 2, formed of sheet metal, is conformed at its rear end 3 to fit the side of the flue 1 and embrace an opening formed therein, the opening not being illustrated. 4 is an attaching screw, there being a similar screw on the opposite side. The housing is circumferentially conformed to provide the restricted throat 5 of substantial width, an inwardly facing annular groove 6 in advance of the throat and an internal annular rib 7 at the rear of the throat, the rib having an internal diameter intermediate the internal diameter of the housing and that of the throat and constituting a merging or reducing element.

The front end of the housing is rolled outwardly into a bead-like flange 8. This conforming of the housing to provide these features stiffens the housing and eliminates the necessity for a separate gate supporting frame or mounting, for example such as is shown in my Patent No. 2,433,749 issued December 30, 1947.

The gate 9 is provided with a rearwardly directed peripheral flange 10 and is preferably somewhat concavo-convex in shape. This gate is of such diameter that when supported within the throat it is swingable therein with its edges in quite close relation to the throat when the gate is in closed position. The gate is provided with pivot openings 11 and 12, the pivot opening 12 being elongated. These pivot openings are arranged in aligned relation above the horizontal center of the gate. The gate is swingably supported by the bowed springable hinge member or support member 13, desirably formed of spring wire stock and of such gauge as to frictionally fit within the groove 6 so that it may be rotatably adjusted in the groove or relative to the housing to various positions to accommodate the mounting of the housing on the flue. It will be understood that there would be an angular range of adjustment of 90° between positions on an upright flue and on a horizontal flue.

The hinge member 13 is provided with inwardly projecting arms 14 terminating in the rearwardly projecting upwardly curved pivot elements 15 which are disposed through the openings 11 and 12 in the gate. The pivot elements 15 desirably have upward extensions 16 which engage the inner side of the throat as shown in Fig. 4, thereby further retaining the hinge member or support in its adjusted positions. The opening 12 is elongated to facilitate the engagement of the pivot elements within the openings.

The gate in the preferred embodiment is provided with a stop 17 struck forwardly therefrom and adapted to engage the adjacent pivot element for limiting the forward swing of the gate. The arms of the extension 16 can be used for that purpose. In the rearward swinging of the gate or the opening thereof, the gate swings on the pivot elements which are desirably upwardly curved as illustrated and under heavy draft the gate tends to slide rearwardly on these pivot elements and this further compensates for variations in draft and resistance to the swinging of the gate inasmuch as there is a lifting and sliding movement. This has the further advantage of keeping the pivoting surfaces free from accumulations that might affect the swinging of the gate.

Counterbalancing means are provided which, though simple in adjustment, have a wide range of adaptation; that is, adjustment to adapt the regulator to various conditions. The gate is provided with an offset 18 having a flat bottom 19 constituting a weight seat. This weight seat is elongated horizontally and is disposed angularly relative to the plane of the gate (see Fig. 3) and extending across the plane of the gate. The seat is provided with a slot 20 which is disposed at a slight incline, the slot also extending across the plane of the gate and angularly relative thereto. The rear main counterweight 21 is, as illustrated, of hexagonal section and is provided with a threaded bore 22 receiving the supporting rod 23 which is, in effect, the stem of the finger piece 24. This stem 23 is arranged through the slot and threaded into the rear main weight 21.

The front weight 25 is arranged on the rod 23 and is clamped against the indicator or pointer member 26. This member 26 is provided with rearwardly projecting lugs 27 which extend through the slot and engage opposed sides of the weight 21 to prevent rotation thereof, thereby enabling adjustment from the front of the gate. The member 26 is provided with pointers 28, while the gate seat is provided with indicia 29 which may be in the form of dimples impressed therein, as illustrated. With this arrangement the center of gravity of the weight is at the rear of the plane of the gate although this may be varied for variations in draft by adjusting along the seat so that the desired torque results. The inclining of the slot 20 also affects the torque.

When the regulator is installed on a horizontal pipe or flue or one approximating the horizontal, the supplementary weight 30 is used. This is washer-like in form and is arranged under the weight 21. When the regulator is mounted on a vertical flue or one approximating the vertical, this supplementary weight is omitted or removed. In the embodiment illustrated the slot 20 is at a slight angle, 1° from the horizontal, the angular relation of the seat to the plane of the gate provides for quite a wide range of adjustment.

In view of the gate being pivoted above the center thereof, the lower portion swings inwardly due to the air pressure and when in quite wide open position gases flowing upwardly in a vertical flue tend to exert a lifting effect on the inner edge of the gate, thereby tending to open it wider than is the case where no gases are flowing in the flue or where the flow is transversely of the gate as in a horizontal installation.

To further point out the adaptability of the regulator when it is installed on a vertical flue the center of gravity of the gate assembly should be below the horizontal plane of the pivot when the gate is fully closed and desirably for at least the first 10° or 12° of movement or rotation of the gate from closed position. This varies somewhat depending on the adjustment of the control for low draft or high draft.

When the regulator is installed on a horizontal flue, when the gate is in its closed position, the center of gravity should lie, as far as it is possible to make it so, in the horizontal plane of the pivot. Therefore, as soon as the gate begins to open the center of gravity will swing above the horizontal plane.

However, when the gate swings to a wide open position, the center of gravity will be above the horizontal plane of the pivot regardless of whether the installation is on a horizontal or vertical flue.

The arrangement of parts I have illustrated and described make the regulator adaptable to various conditions as to flue positions and the existing normal conditions. The use of the supplemental weight not only provides an additional weight but it also extends the weight 31 rearwardly thereby lengthening the moment arm and further increasing the torque.

My present invention is capable of very economical embodiment and has a wide range of adaptation. I have illustrated and described my invention in an embodiment which I have found highly practical. I have not attempted to illustrate or describe other embodiments or adaptations which I contemplate as it is believed that this disclosure will enable those skilled in the art to embody or adapt my invention as may be desired.

Having thus described my invention what I claim as new and desire to secure by Letters Patent is:

1. In a draft regulator, a cylindrical open ended housing circumferentially corrugated to provide an annular throat portion of substantial width, an inwardly facing annular groove at the front of said throat portion, a gate having aligned pivot openings positioned above the horizontal center thereof, one of said openings being circular and the other horizontally elongated, a bowed springable hinge member springably engaging said groove for frictionally retained rotative adjustment therein, said hinge member having inwardly projecting arms at its ends terminating in rearwardly projecting upwardly curved pivot elements disposed through said pivot openings in said gate for swingably supporting the gate, the ends of the pivot elements extending upwardly into supported engagement with the said throat portion, the edge of the circular pivot opening of the gate coacting with the pivot element engaged therewith to retard the opening of the gate beyond a predetermined position, a stop on said gate coacting with one of said pivot elements for limiting the forward movement of the gate, and a counterweight for said gate mounted thereon above its pivot axis.

2. In a draft regulator, a cylindrical open ended housing circumferentially corrugated to provide an annular throat portion of substantial width, an inwardly facing annular groove at the front of said throat portion, a gate having aligned pivot openings positioned above the horizontal center thereof, a bowed springable hinge member springably engaging said groove for frictionally retained rotative adjustment therein, said hinge member having inwardly projecting arms at its ends terminating in rearwardly projecting upwardly curved pivot elements disposed through said pivot openings in said gate for swingably supporting the gate, and a counterweight for said gate mounted thereon above its pivot axis.

3. In a draft regulator, a cylindrical open ended housing circumferentially corrugated to provide an annular throat portion of substantial width, an inwardly facing annular groove at the front of said throat portion, an internal annular rib at the rear of and closely adjacent to said throat portion and of a diameter intermediate the internal diameter of the housing and said throat portion, a gate having aligned pivot openings positioned above the horizontal center thereof, a bowed springable hinge member springably engaging said groove for frictionally retained rotative adjustment therein, said hinge member having inwardly projecting arms at its ends terminating in rearwardly projecting upwardly curved pivot elements disposed through said pivot openings in said gate for swingably supporting the gate, and a counterweight for said gate mounted thereon above its pivot axis.

4. In a draft regulator, a cylindrical open ended housing circumferentially corrugated to provide an annular throat portion of substantial width, an inwardly facing annular groove at the front of said throat portion, a gate having aligned pivot openings positioned above the horizontal center thereof, a bowed springable hinge member springably engaging said groove for rotative adjustment therein, said hinge member having inwardly projecting arms providing rearwardly projecting pivot elements disposed through said pivot openings in said gate for swingably supporting the gate, and a stop on said gate coacting with one of said pivot elements for limiting the forward movement of the gate.

5. In a draft regulator, an open ended housing having an annular restricted throat portion, an inwardly facing annular groove at the front of said throat portion, a gate having aligned pivot openings, a bowed hinge member engaging said groove for rotative adjustment therein, said hinge member having inwardly projecting arms at its ends terminating in rearwardly projecting pivot elements disposed through said pivot openings in said gate, a stop on said gate coacting with one of said pivot elements for limiting the forward movement of the gate, and a counterweight for said gate.

6. In a draft regulator, an open ended housing having an annular restricted throat portion, an inwardly facing annular groove at the front of said throat portion, a gate having aligned pivot openings, a bowed hinge member engaging said groove for rotative adjustment therein, said hinge member having inwardly projecting arms at its ends terminating in rearwardly projecting pivot elements disposed through said pivot openings in said gate, and a counterweight for said gate.

7. In a draft regulator, an open ended housing having an annular restricted throat portion, an inwardly facing annular groove at the front of said throat portion, a gate having aligned pivot openings, a bowed hinge member engaging said groove for rotative adjustment therein, said hinge member having inwardly projecting arms at its ends terminating in rearwardly projecting pivot elements disposed through said pivot openings in said gate, the ends of the pivot elements extending upwardly into supported engagement with the housing, and a counterweight for said gate.

8. In a draft regulator, an open ended housing having an annular restricted throat portion, an inwardly facing annular groove at the front of said throat portion, a gate having aligned pivot openings, one of said openings being circular and the other horizontally elongated, and a bowed springable hinge member springably engaging said groove for rotative adjustment therein, said hinge member having inwardly projecting arms at its ends terminating in rearwardly projecting pivot elements disposed through said pivot openings in said gate.

9. In a draft regulator, a cylindrical open ended housing of integral sheet metal circumferentially conformed adjacent its outer end to provide an annular throat portion of internal dimensions substantially less than that of the housing both inwardly and outwardly of the annular throat portion, an inwardly facing annular groove at the front of said throat portion, and an internal reducing portion at the rear of said throat portion of a diameter intermediate the internal diameter of the housing and said throat portion, a gate, a bowed hinge member supportingly retained in said groove for rotative adjustment therein and carrying pivot elements swingably supporting the gate on an axis disposed transversely the housing and offset a substantial distance from the longitudinal axis of the housing, the plane of said gate coinciding with the plane of said annular throat portion when the gate is closed, the outer dimensions of the gate being only slightly less than that of the internal dimensions of said annular throat but substantially less than the internal dimensions of the housing inwardly of said annular throat portion and annular reducing portion, to thereby reduce leakage by the gate to a minimum when the gate is closed and to permit the gate to move to widely opened positions without engaging the housing.

10. In a draft regulator, a housing having an annular inwardly facing groove therein, a gate, and a bowed springable hinge member supportingly retained under spring compression in said groove for rotative and frictionally retained adjustment therein and provided with pivot elements for swingably supporting the gate.

11. In a draft regulator, a housing having an inwardly facing groove therein, a gate, and a hinge member disposed in said housing and in said groove for rotative adjustment therein and provided with pivot elements swingably supporting the gate, said hinge member being radially expansible to facilitate insertion of the same into the housing and into the inwardly facing groove and removal therefrom, said pivot elements being rigid with the hinge member and separable from each other by expansion of said hinge member.

12. In a draft regualtor, a housing, a gate, a springable support for said gate mounted in said housing under spring compression for springable and frictionally retained rotative adjustment therein, said support member being provided with pivot elements on which said gate is swingably supported.

13. In a draft regulator, a housing having an inwardly facing annular groove, a gate having pivot openings therein positioned above the horizontal center thereof, a bowed hinge member engaging said groove for rotative adjustment therein, said hinge member having inwardly projecting arms terminating in rearwardly and upwardly curved pivot elements disposed through said pivot openings in said gate for swingably supporting the gate, said gate having an elongated offset therein above the plane of said pivot openings, the bottom of the offset constituting a flat counterweight seat extending angularly across the plane of the gate, said seat having a slot extending transversely of the gate and across the plane of the gate, a rear counterweight disposed on the rear side of said seat, a counterweight supporting rod provided with a finger piece at its front end disposed through said slot and having threaded engagement with said rear counterweight, a pointer member disposed on the front side of said slot therein and engaging said rear counterweight for preventing rotative movement thereof, said gate being provided with positioning indicia with which the pointer is associated, a front counterweight arranged on said rod in front of said pointer member.

14. In a draft regulator, a housing having an inwardly facing annular groove, a gate having pivot openings therein positioned above the horizontal center thereof, a bowed hinge member engaging said groove for rotative adjustment therein, said hinge member having inwardly projecting arms terminating in rearwardly and upwardly curved pivot elements disposed through said pivot openings in said gate for swingably supporting the gate, said gate having an elongated offset therein above the plane of said pivot openings, the bottom of the offset constituting a flat counterweight seat extending angularly across the plane of the gate, said seat having a slot extending transversely of the gate and across the plane of the gate, a rear counterweight disposed on the rear side of said seat, a counterweight supporting rod provided with a finger piece at its front end disposed through said slot and having threaded engagement with said rear counterweight.

15. In a draft regulator, a housing having an inwardly facing annular groove, a gate having pivot openings therein positioned above the horizontal center thereof, a bowed hinge member engaging said groove for rotative adjustment therein, said hinge member having inwardly projecting arms terminating in rearwardly and upwardly curved pivot elements disposed through said pivot openings in said gate for swingably supporting the gate, said gate having an elongated offset therein above the plane of said pivot openings, the bottom of the offset constituting a flat counterweight seat extending angularly across the plane of the gate, said seat having a slot extending transversely of the gate and across the plane of the gate, a rear counterweight disposed on the rear side of said seat, a counterweight supporting rod provided with a finger piece at its front end disposed through said slot and having threaded engagement with said rear counterweight, and a second rear counterweight adapted to be disposed on said rod at the front of said rear counterweight.

16. In a draft regulator, a housing, a gate, a support for said gate mounted in said housing for rotative adjustment therein, said gate being swingably mounted on said support, said gate having an offset therein above the plane of the axis of the gate, the bottom of the offset constituting a counterweight seat extending angularly of the plane of the gate, the seat having a slot therein extending transversely of the gate, a main counterweight disposed on the rear side of said seat, a supporting rod for said rear counterweight disposed through said slot and provided with means for clampingly securing the rear counterweight in different positions of adjustment on said seat, and a second counterweight which may be used to complement said main counterweight to compensate for the varying conditions resulting from the positioning of the housing on a vertical or horizontal flue.

17. In a draft regulator, a housing, a gate, a hinge mounted in said housing for rotative adjustment therein and on which said gate is swingably mounted, said gate having an offset therein the bottom of which constitutes a counterweight seat extending angularly of the plane of the gate, said seat having a slot extending transversely of the gate, a rear counterweight disposed on the rear side of said seat, a counterweight supporting rod provided with a finger piece at its front end disposed through said slot and having threaded engagement with said rear counterweight, a pointer member disposed on the front side of said seat and provided with lugs projecting through the slot therein and engaging said rear counterweight for preventing rotative movement thereof, said gate being provided with positioning indicia with which the pointer is associated, a front counterweight arranged on said rod in front of said pointer member, and a second rear counterweight adapted to be disposed on said rod rear counterweight.

18. In a draft regulator, a housing, a gate, a hinge mounted in said housing for rotative adjustment therein and on which said gate is swingably mounted, said gate having an offset therein the bottom of which constitutes a counterweight seat extending angularly of the plane of the gate, said seat having a slot extending transversely of the gate, a rear counterweight disposed on the rear side of said seat, a counterweight supporting rod provided with a finger piece at its front end disposed through said slot and having threaded engagement with said rear counterweight, a front counterweight arranged on said rod in front of said pointer member, and a second rear counterweight adapted to be disposed on said rod rear counterweight.

EDWARD A. FIELD, Jr.

REFERENCES CITED

The following references are of record in the file of this patent:

UNITED STATES PATENTS

| Number | Name | Date |
| --- | --- | --- |
| 1,628,644 | Breese | May 17, 1927 |
| 1,809,005 | Walker | June 9, 1931 |
| 2,180,622 | Vincent | Nov. 21, 1939 |
| 2,228,857 | Stephenson | Jan. 14, 1941 |
| 2,416,468 | Carsten | Feb. 23, 1947 |